(12) United States Patent
Bishara et al.

(10) Patent No.: US 8,472,445 B1
(45) Date of Patent: *Jun. 25, 2013

(54) EFFICIENT HOST-CONTROLLER ADDRESS LEARNING IN ETHERNET SWITCHES

(75) Inventors: Nafea Bishara, San Jose, CA (US); Tsahi Daniel, Palo Alto, CA (US); David Melman, D.N. Bikat Beit Hakerem (IL)

(73) Assignees: Marvell Israel (M.I.S.L) Ltd, Yokneam (IL); Marvell International Ltd., Hamilton (BM)

( * ) Notice: Subject to any disclaimer, the term of this patent is extended or adjusted under 35 U.S.C. 154(b) by 313 days.

This patent is subject to a terminal disclaimer.

(21) Appl. No.: 12/917,405

(22) Filed: Nov. 1, 2010

Related U.S. Application Data

(63) Continuation of application No. 10/761,879, filed on Jan. 21, 2004, now Pat. No. 7,826,452.

(60) Provisional application No. 60/457,262, filed on Mar. 24, 2003.

(51) Int. Cl.
*H04L 12/28* (2006.01)

(52) U.S. Cl.
USPC .......................................................... 370/392

(58) Field of Classification Search
None
See application file for complete search history.

(56) References Cited

U.S. PATENT DOCUMENTS

| | | | |
|---|---|---|---|
| 5,339,449 A * | 8/1994 | Karger et al. ..................... 710/6 |
| 6,115,378 A * | 9/2000 | Hendel et al. .................. 370/392 |
| 6,438,129 B1 | 8/2002 | Jennings et al. |
| 6,442,144 B1 | 8/2002 | Hansen et al. |
| 6,529,507 B1 | 3/2003 | O'Malley et al. |
| 6,535,498 B1 | 3/2003 | Larsson et al. |
| 6,633,565 B1 | 10/2003 | Bronstein et al. |
| 6,683,875 B1 | 1/2004 | Byham et al. |
| 6,751,225 B1 | 6/2004 | Chung |
| 6,763,023 B1 | 7/2004 | Gleeson et al. |
| 6,912,592 B2 | 6/2005 | Yip |
| 6,940,814 B1 | 9/2005 | Hoffman |
| 7,286,528 B1 | 10/2007 | Pannell |
| 7,443,856 B2 | 10/2008 | Lodha et al. |
| 2003/0142680 A1 | 7/2003 | Oguchi |
| 2004/0133619 A1 | 7/2004 | Zelig et al. |
| 2004/0215758 A1 | 10/2004 | Kompella et al. |
| 2005/0207414 A1 | 9/2005 | Duvvury |
| 2010/0316053 A1 * | 12/2010 | Miyoshi et al. ............... 370/392 |

FOREIGN PATENT DOCUMENTS

EP     1 054 533 A2     11/2000

\* cited by examiner

*Primary Examiner* — Andrew Lai
*Assistant Examiner* — Leon Andrews

(57) ABSTRACT

A network switch including a port, a memory, and a controller. The port has a port identifier and receives a packet (including an address of the source device) transmitted from a source device to the network switch. The memory is configured to store entries, each entry including (i) an identifier of a port of the network switch and (ii) an address of a network device. The controller is configured to (i) determine whether the address of the source device and the port identifier of the packet are stored in the memory and (ii) send a message to a processor requesting approval of the packet. The controller is configured to send the message when (i) the address of the source device is not stored in the memory or (ii) the port identifier of the packet is not stored with the address of the source device as one of the entries.

20 Claims, 4 Drawing Sheets

EFFICIENT HOST-CONTROLLER ADDRESS LEARNING IN ETHERNET SWITCHES

CROSS-REFERENCE TO RELATED APPLICATIONS

This application claims the benefit of U.S. patent application Ser. No. 10/761,879 filed Jan. 21, 2004, which claims the benefit of U.S. Provisional Patent Application Ser. No. 60/457,262 filed Mar. 24, 2003, the disclosure thereof incorporated by reference herein in its entirety.

BACKGROUND

The present invention relates generally to data communication systems. More particularly, the present invention relates to address learning in data communication switches.

Self-routed packet data communication switches route packets according to addresses contained in the packets. For example, level-2 switches route each packet according to the destination media access control (MAC) address in the packet. Each switch comprises a forwarding database (FDB) that stores associations between MAC addresses and the ports of the switch. When a packet is received having with a particular destination MAC address, the switch transmits the packet through the port associated with the particular destination MAC address.

Some switches "learn" the FDB associations from the incoming packets. That is, when a packet is received with a particular source MAC address, the switch creates an association in the FDB between the particular source MAC address and the port on which the packet was received. That association is then used to route packets subsequently received by the switch with this MAC address as the destination.

For example, Ethernet switches that are compliant with the IEEE 802.1D-1998 specification are required to "learn" the FDB associations from the incoming packets. Learning can be automatic or controlled by a central processing unit (CPU). In either case the switch sends a notification message to the CPU each time the association between a MAC address and a port changes, for example when the switch receives a packet having a source MAC address that is not associated with a port, or when a MAC address associated with one port becomes associated with another port.

However, in controlled learning, the switch may receive many more packets having the new source MAC address, and therefore send many more notification messages to the CPU, before the CPU can respond to the first notification message. This plethora of unnecessary messages can burden the CPU unnecessarily, and can even provide an opportunity for a denial-of-service attack.

SUMMARY

In general, in one aspect, the invention features a method, apparatus, and computer-readable media for a switch comprising a plurality of network ports and a central processing unit (CPU) interface. It comprises receiving, on one of the network ports, a packet comprising a source media access control (MAC) address; sending, to the CPU interface, a request to approve an association between the one of the network ports and the source MAC address when no request to approve the association between the one of the network ports and the source MAC address has been sent to the CPU interface; and sending, to the CPU interface, the request to approve the association between the one of the network ports and the source MAC address when an association between the source MAC address and a different one of the network ports has been approved.

Particular implementations can include one or more of the following features. Implementations comprise determining whether an association exists between any of the network ports and the source MAC address. Determining whether an association exists between any of the network ports and the source MAC address comprises searching a forwarding database for the source MAC address. Implementations comprise determining whether no request to approve the association between the one of the network ports and the source MAC address has been sent to the CPU interface. Determining whether no request to approve the association between the one of the network ports and the source MAC address has been sent to the CPU interface comprises determining whether an unapproved association between the one of the network ports and the source MAC address exists. Determining whether the unapproved association between the one of the network ports and the source MAC address exists comprises determining whether the association between the one of the network ports and the source MAC address exists; and when the association between the one of the network ports and the source MAC address exists, determining whether the association between the one of the network ports and the source MAC address is approved. Determining whether the association between the one of the network ports and the source MAC address exists comprises searching a forwarding database for an entry comprising the source MAC address. Determining whether the association between the one of the network ports and the source MAC address is approved comprises determining whether an approval flag is set for the entry comprising the source MAC address. Implementations comprise creating an unapproved association between the one of the network ports and the source MAC address. Creating the unapproved association between the one of the network ports and the source MAC address comprises creating the association between the one of the network ports and the source MAC address; and marking the association between the one of the network ports and the source MAC address as unapproved. Creating the association between the one of the network ports and the source MAC address comprises creating an entry in a forwarding database, the entry identifying the one of the network ports and the source MAC address. Marking the association between the one of the network ports and the source MAC address as unapproved comprises setting an approval flag for the entry. Implementations comprise receiving, from the CPU interface, in response to the request to approve the association between the one of the network ports and the source MAC address, an approval of the association between the one of the network ports and the source MAC address; and clearing the approval flag for the entry. Implementations comprise receiving, from the CPU interface, in response to the request to approve the association between the one of the network ports and the source MAC address, a disapproval of the association between the one of the network arts and the source MAC address; and deleting the entry. Implementations comprise receiving, from the CPU interface, in response to the request to approve the association between the one of the network ports and the source MAC address, an approval of the association between the one of the network ports and the source MAC address; and approving the unapproved association between the one of the network ports and the source MAC address. Implementations comprise receiving, from the CPU interface, in response to the request to approve the association between the one of the network ports and the source MAC address, a disapproval of the association between the one of the network ports and the source MAC address; and deleting the unapproved association between the one of the network ports and the source MAC address. The packet further comprises a destination MAC address, and implementations comprise processing the packet according to the destination MAC address when an association between the destination MAC address and a further one of the network ports exists and the association between the destination MAC address and the further one of the network ports has been approved; and processing the packet without regard to the destination MAC address when no association between the destination MAC address and any of the network ports exists; and processing the packet without regard to the destination MAC address when the association between the destination MAC address and the further one of the network ports exists but the association between the destination MAC address and the further one of the network ports has not been approved. Processing the packet according to the destination MAC address comprises transmitting the packet from the further one of the network ports. Processing the packet without regard to the destination MAC address comprises transmitting the packet from all of the network ports but the one of the network ports.

The details of one or more implementations are set forth in the accompanying drawings and the description below. Other features will be apparent from the description and drawings, and from the claims.

Figure 1:
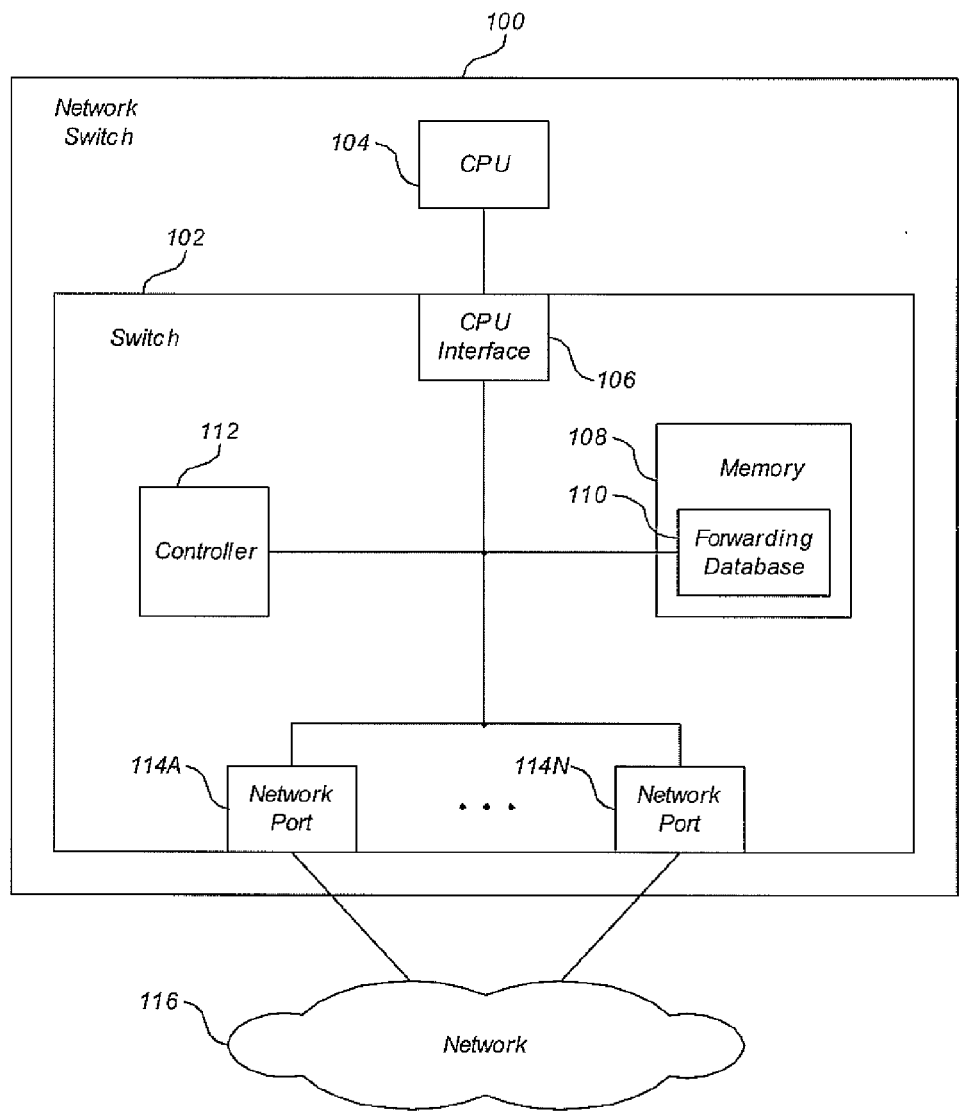
FIG. 1 shows a network switch according to a preferred embodiment of the present invention.

The leading digit(s) of each reference numeral used in this specification indicates the number of the drawing in which the reference numeral first appears.

DETAILED DESCRIPTION

Embodiments of the present invention employ techniques to ensure that, for each new source media access control (MAC) address encountered by a switch, only one notification message is sent to the central processing unit (CPU), thereby reducing traffic between the CPU and the switch, reducing the workload of the switch and CPU, and reducing the opportunities for denial-of-service attacks on the switch. In particular, embodiments of the present invention send a notification message for a new source MAC address to the CPU only when no such notification message has been sent. Embodiments of the present invention keep track of whether a notification message has been sent to the CPU by creating an association between the source MAC address and the port on which the packet was received. The association is marked unapproved until a message is received from the CPU in response to the notification message. No notification message is sent for an unapproved association, thereby ensuring that only one notification message is sent to the CPU for each new source MAC address.

Embodiments of the present invention create an association between a source MAC address and a port by storing an entry in the forwarding database (FDB) of the switch. The entry includes the source MAC address and the port identifier for the port. Embodiments of the present invention record whether such an association is approved using a flag for each such entry, referred to herein as the approval flag. When the approval flag for an entry is set, the entry is referred to as an unapproved entry. When the approval flag for an entry is clear, the entry is referred to as an approved entry. Only approved entries are used for bridging packets.

FIG. 1 shows a network switch 100 according to a preferred embodiment of the present invention. Network switch 100 comprises a switch 102, which can be fabricated as a single integrated circuit, and a central processing unit (CPU) 104. Switch 102 comprises a controller 112 and a CPU interface 106 to permit controller 112 to communicate with CPU 104. Switch 102 also comprises a plurality of network ports 114A through 114N for exchanging packets of data with a network 116 such as the Internet under the control of controller 112 and according to the contents of a forwarding database (FDB) 110 stored in a memory 108.

Figure 2:
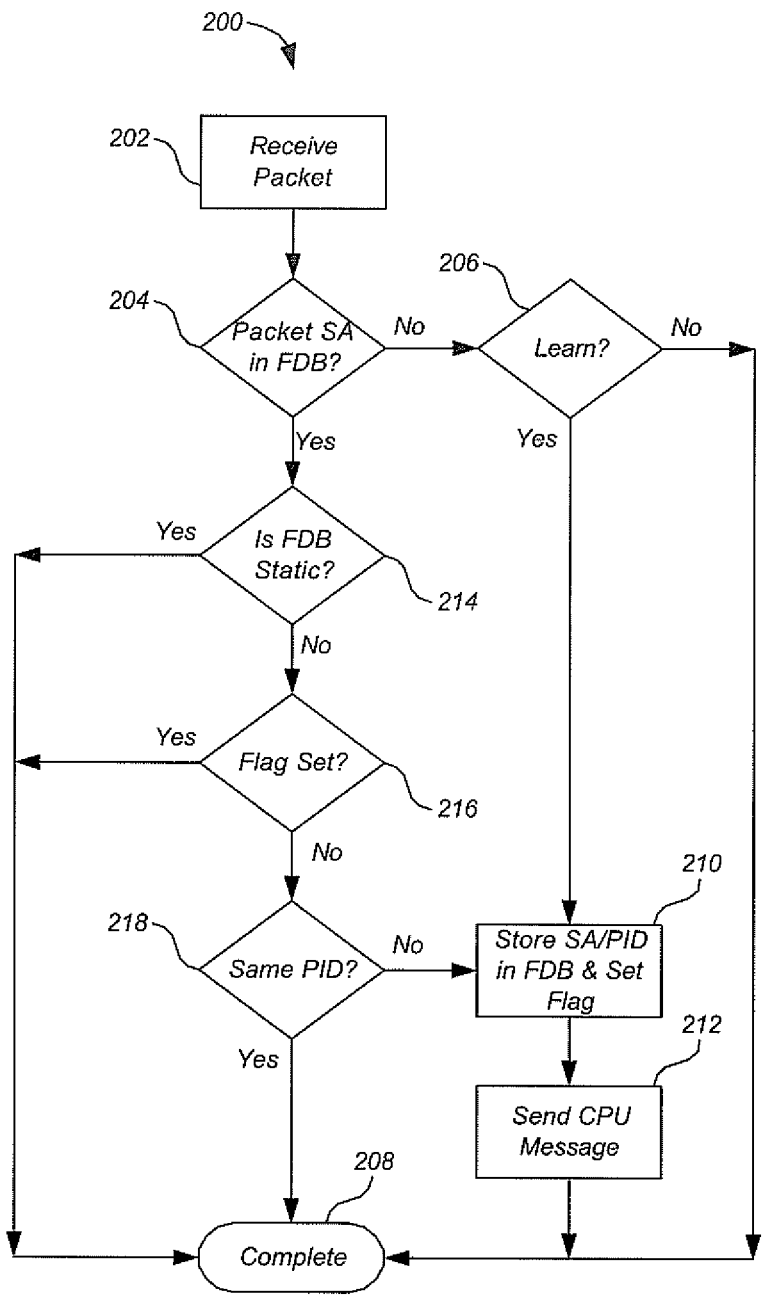
FIG. 2 shows a learning process for the controller of the switch of FIG. 1 according to a preferred embodiment of the present invention.

FIG. 2 shows a learning process 200 for the controller 112 of the switch 102 of FIG. 1 according to a preferred embodiment of the present invention. Learning process 200 begins when switch 102 receives a packet on one of network ports 114 (step 202). Controller 112 determines whether an association exists between the source MAC address of the packet and any of the network ports 114 (step 204), preferably by searching FDB 110 for an entry comprising the source MAC address.

If there is no entry in the FDB for the source MAC address of the packet, controller 112 determines whether learning is enabled for switch 102 (step 206). If learning is disabled, process 200 is complete (step 208). However, if learning is enabled, controller 112 creates an unapproved association, preferably by storing an entry in FDB 110 that comprises the source MAC address of the packet and the port identifier (PID) of the network port 114 on which the packet was received, and by setting an approval flag for the entry (step 210). Controller 112 also sends a notification message to CPU 104 that requests approval for the association (step 212). Then process 200 is complete (step 208).

However, if an association exists for the source MAC address (step 204), controller 112 determines whether FDB 110 is static (Step 214). If FDB 110 is static, process 200 is complete (step 208). But if FDB 110 is not static, controller 112 determines whether the association is approved, preferably by determining whether the approval flag is set for the association's FDB entry (step 216). If the approval flag is set, indicating that a notification message was sent to CPU 104 but no reply has been received, then process 200 is complete (step 208).

However, if the approval flag is clear (that is, not set), indicating that the entry has been approved by CPU 104 (step 216), then controller 112 determines whether the packet was received from the network port indicated in the association, preferably by comparing the port identifier (PID) in the FDB entry to the PID of the network port on which the packet was received (step 218). If the PIDs are the same, then process 200 is complete (step 208).

But if the PIDs differ (step 218), switch 102 must learn the new association. Therefore, controller 112 creates an unapproved association, preferably by storing an entry in FDB 110 that comprises the source MAC address of the packet and the port identifier (PID) of the network port 114 on which the packet was received, and by setting the approval flag for the entry (step 210). Controller 112 also sends a notification message to CPU 104 that requests approval for the association (step 212). Then process 200 is complete (step 208).

Figure 3:
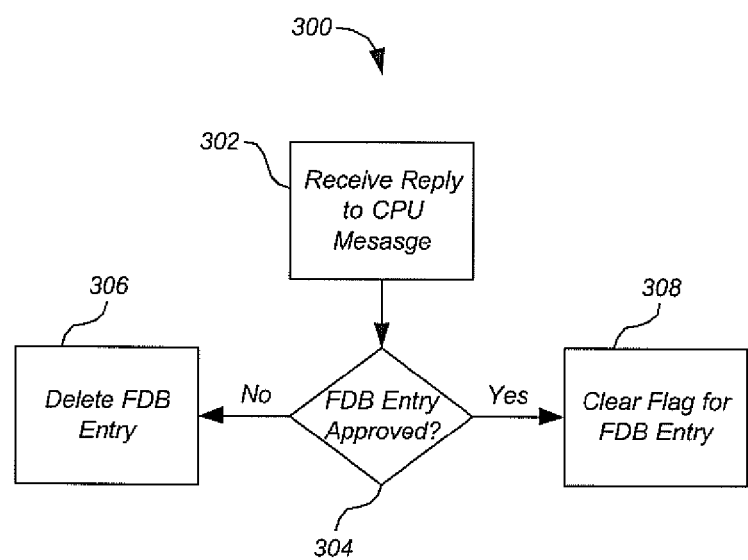
FIG. 3 shows another learning process for the controller of the switch of FIG. 1 according to a preferred embodiment of the present invention.

FIG. 3 shows another learning process 300 for the controller 112 of the switch 102 of FIG. 1 according to a preferred embodiment of the present invention. Learning process 300 begins when switch 102 receives a reply from CPU 104 to a notification message (step 302). Controller 112 determines whether the reply message approves the association for which approval was requested in the notification message (step 304). If the reply message comprises a disapproval of the association, then controller 112 deletes the association, preferably by deleting the FDB entry for the association (step 306).

But if the reply message comprises an approval of the association (step 304), then controller 112 approves the association, preferably by clearing the approval flag for the FDB entry for the association (step 308). Controller 112 may also respond to other instructions in the reply message, for example by changing one or more attributes of the association. Controller 112 can delete associations in other ways as well. For example, controller 112 can delete an association when it reaches a certain age. In some embodiments, controller 112 routinely scrubs FDB 110 to delete associations older than a predetermined age. In such embodiments, CPU 104 need not send a reply message to disapprove an association, instead relying on the scrub process to delete the association.

Figure 4:
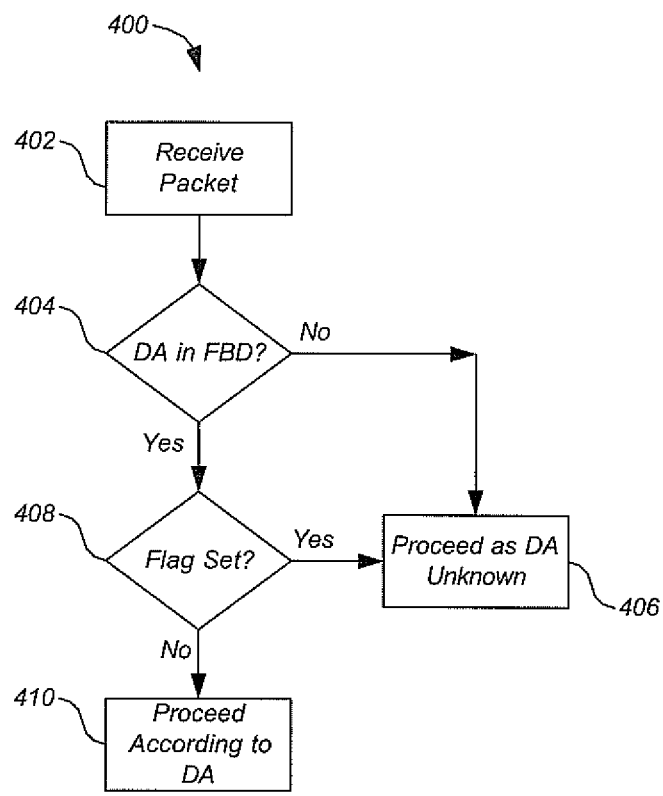
FIG. 4 shows a forwarding process for the controller of the switch of FIG. 1 according to a preferred embodiment of the present invention.

FIG. 4 shows a forwarding process 400 for the controller 112 of the switch 102 of FIG. 1 according to a preferred embodiment of the present invention. Process 400 begins when switch 102 receives a packet (step 402) comprising a destination MAC address. Controller 112 searches FDB 110 for an association for the destination MAC address (step 404). If no association exists for the destination MAC address, then controller 112 proceeds as though the destination MAC address is unknown (step 406). For example, controller 112 can transmit the packet from all of the network ports of the switch except the network port on which the packet was received.

However, if controller 112 finds an association for the destination MAC address in FDB 110 (step 404), controller 112 determines whether the association is approved, preferably by testing the approval flag for the association's FDB entry (step 408). If the approval flag is set, meaning the association is unapproved, then controller 112 proceeds as though the destination MAC address is unknown (step 406).

However, if the approval flag is clear (step 408), then controller 112 proceeds according to the destination MAC address (step 410). For example, controller 112 transmits the packet from the network port 114 that is associated with the destination MAC address in the FDB entry.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network switch comprising:
   a plurality of network ports, wherein a first port of the plurality of network ports has a port identifier and receives a first packet transmitted from a source device via a network to the network switch, wherein the first packet comprises an address of the source device;
   a memory configured to store a forwarding database, wherein the forwarding database comprises entries, and wherein each of the entries comprises (i) an identifier of one of the plurality of network ports and (ii) an address of a network device; and
   a controller configured to
      determine whether the address of the source device is stored in the memory,
      determine whether the port identifier of the first packet is stored in the memory, and
      send a first message to a processor requesting approval of the first packet,
   wherein the controller is configured to send the first message to the processor when (i) the address of the source device is not stored in the memory or (ii) the port identifier of the first packet is not stored with the address of the source device as one of the entries in the forwarding database.

2. The network switch of claim 1, further comprising:
   the processor; and
   a switch comprising
      a processor interface in communication with the processor,
      the plurality of network ports in communication with the controller,
      the memory in communication with the controller, and
      the controller, wherein the controller is configured to send the first message to the processor via the processor interface.

3. The network switch of claim 1, wherein the controller is configured to send the first message to the processor when the address of the source device (i) is stored in the memory and (ii) is not stored with an identifier of one of the plurality of ports as one of the entries in the forwarding database.

4. The network switch of claim 1, wherein the controller is configured to not send the first message to the processor when the address of the source device (i) is stored in the memory and (ii) is not stored with an identifier of one of the plurality of ports as one of the entries in the forwarding database.

5. The network switch of claim 1, wherein the controller is configured to send the first message to the processor when the address of the source device (i) is stored in the memory and (ii) the port identifier of the first packet is not stored with the address of the source device as one of the entries in the forwarding database.

6. The network switch of claim 1, wherein:
the controller is configured to send the first message to the processor when the address of the source device (i) is stored in the memory and (ii) is not stored with an identifier of one of the plurality of ports as one of the entries in the forwarding database; and
the controller is configured to not send the first message to the processor when the address of the source device (i) is stored in the memory and (ii) is stored with an identifier of one of the plurality of ports as one of the entries in the forwarding database.

7. The network switch of claim 1, wherein:
the controller is configured to send the first message to the processor when (i) the address of the source device is stored in the memory and (ii) the port identifier of the first packet is not stored with the address of the source device as one of the entries in the forwarding database; and
the controller is configured to not send the first message to the processor when (i) the address of the source device is stored in the memory and (ii) the port identifier of the first packet is stored with the address of the source device as one of the entries in the forwarding database.

8. The network switch of claim 1, wherein the controller is configured to (i) send the first message when the forwarding database is not static and (ii) not send the first message when the forwarding database is static.

9. The network switch of claim 1, wherein the controller is configured to send the first message when no request to approve an association between (i) the address of the source device and (ii) the port identifier of the first packet has been sent to the processor.

10. The network switch of claim 1, further comprising the processor, wherein:
the controller is configured to send the first message to the controller requesting approval of an association between (i) the address of the source device and (ii) the first port of the network switch; and
the processor is configured to send an approval response to the processor for the association between (i) the address of the source device and (ii) the first port of the network switch.

11. The network switch of claim 10, wherein:
a second port of the plurality of network ports receives a second packet from the source device;
the controller is configured to send a second message requesting approval of an association between (i) the address of the source device and (ii) the second port; and
the second message is sent to the processor (i) subsequent to receiving the approval response and (ii) based on whether the controller receives the approval response from the processor.

12. The network switch of claim 11, wherein the controller is configured to not send the second message when (i) the first message has been sent to the processor and (ii) the approval response has not been received from the processor.

13. The network switch of claim 11, wherein the controller is configured to (i) send the second message when the first message has been approved by the processor and (ii) not send the second message when the first message has not been approved by the processor.

14. The network switch of claim 10, wherein:
the first port of the plurality of network ports receives a second packet from the source device;
the controller is configured to not send a second message to the processor requesting approval of an association between (i) the address of the source device and (ii) the first port; and
the controller is configured to not send the second message when one of the entries includes the address of the source device and the port identifier of the first port.

15. The network switch of claim 1, wherein:
the controller is configured to store the address of the source device and the port identifier of the first packet as an entry in the forwarding database when the entries in the forwarding database do not include the address of the source device; and
the controller is configured to (i) send the first message subsequent to storing the entry of the first packet and (ii) set a flag indicating that the entry of the first packet is unapproved.

16. The network switch of claim 15, wherein the controller is configured to change state of the flag when the controller receives an approval response for the entry of the first packet from the processor.

17. The network switch of claim 11, wherein:
the controller is configured to store the address of the source device and the port identifier of the first packet as an entry in the forwarding database when the entries in the forwarding database (i) include the address of the source device and (ii) do not include an entry with the address of the source device and the port identifier of the first packet; and
the controller is configured to (i) send the first message subsequent to storing the entry of the first packet and (ii) set a flag indicating that the entry of the first packet is unapproved.

18. The network switch of claim 17, wherein the controller is configured to store the address of the source device and the port identifier of the first packet as the entry based on state of the flag.

19. The network switch of claim 17, wherein:
the controller is configured to store the address of the source device and the port identifier of the first packet as the entry when the flag is set to indicate that an approved association for the address of the source device is stored in the forwarding database; and
the controller is configured to not store the address of the source device and the port identifier of the first packet as the entry when the flag is not set.

20. The network switch of claim 19, wherein:
the controller is configured to store the address of the source device and the port identifier of the first packet as the entry when none of the entries in the forwarding database include the address of the source device and the port identifier of the first packet; and
the controller is configured to not store the address of the source device and the port identifier of the first packet as the entry when one of the entries of the forwarding database includes the address of the source device and the port identifier of the first packet.

* * * * *